(12) United States Patent
Clark

(10) Patent No.: US 9,932,258 B1
(45) Date of Patent: Apr. 3, 2018

(54) APPARATUS AND PROCESS FOR MAKING GLASS AND GLASS GOBS

(71) Applicant: Owens-Brockway Glass Container Inc., Perrysburg, OH (US)

(72) Inventor: Terence J Clark, Bowling Green, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 21 days.

(21) Appl. No.: 14/255,417

(22) Filed: Apr. 17, 2014

(51) Int. Cl.
| | | |
|---|---|---|
| C03B 1/02 | (2006.01) | |
| C03B 3/00 | (2006.01) | |
| C03B 7/096 | (2006.01) | |

(52) U.S. Cl.
CPC ............... C03B 7/096 (2013.01); C03B 1/02 (2013.01)

(58) Field of Classification Search
CPC ...................................................... C03B 3/00
See application file for complete search history.

(56) References Cited

U.S. PATENT DOCUMENTS

| | | | | |
|---|---|---|---|---|
| 708,309 | A * | 9/1902 | Bronn | C03B 5/14 204/164 |
| 2,593,197 | A | 4/1952 | Rough | |
| 2,815,135 | A * | 12/1957 | Heinrich | C03B 3/00 198/771 |
| 2,911,759 | A * | 11/1959 | Pilkington et al. | C03B 13/04 65/157 |
| 3,944,713 | A * | 3/1976 | Plumat | C03B 3/02 373/34 |
| 4,013,438 | A * | 3/1977 | Gladieux | C03B 18/06 65/182.4 |
| 4,310,342 | A * | 1/1982 | Richards | C03B 3/023 165/111 |
| 4,380,463 | A | 4/1983 | Matesa | |
| 5,643,350 | A | 7/1997 | Mason et al. | |
| 5,891,011 | A * | 4/1999 | Wicks | A62D 3/178 204/157.15 |
| 6,185,243 | B1 | 2/2001 | Boen et al. | |
| 6,289,697 | B1 | 9/2001 | Perry et al. | |
| 6,576,807 | B1 | 6/2003 | Brunelot et al. | |
| 6,848,275 | B1 | 2/2005 | Kolberg et al. | |
| 6,909,075 | B2 | 6/2005 | Jakes et al. | |
| 7,296,441 | B2 | 11/2007 | Leister et al. | |
| 8,997,525 | B2 * | 4/2015 | Shock | C03B 19/08 65/324 |
| 2004/0056026 | A1 * | 3/2004 | Jakes | C03B 5/023 219/701 |
| 2011/0088432 | A1 | 4/2011 | Purnode et al. | |

OTHER PUBLICATIONS

V. F. Solinov & Yu. M. Shershnev, A New Technology for Producing Finely Dispersed Glass Batch, 62 Glass and Ceramics 35, 37 (2005).

* cited by examiner

Primary Examiner — Cynthia Szewczyk

(57) ABSTRACT

An apparatus and process for making glass and glass gobs on demand. A sheet of molten glass is provided in a staging section. The sheet of molten glass is held within the staging section when there is no demand for glass articles. When there is a demand for production of glass articles, a portion of the sheet of molten glass is flowed into a gob forming section.

26 Claims, 2 Drawing Sheets

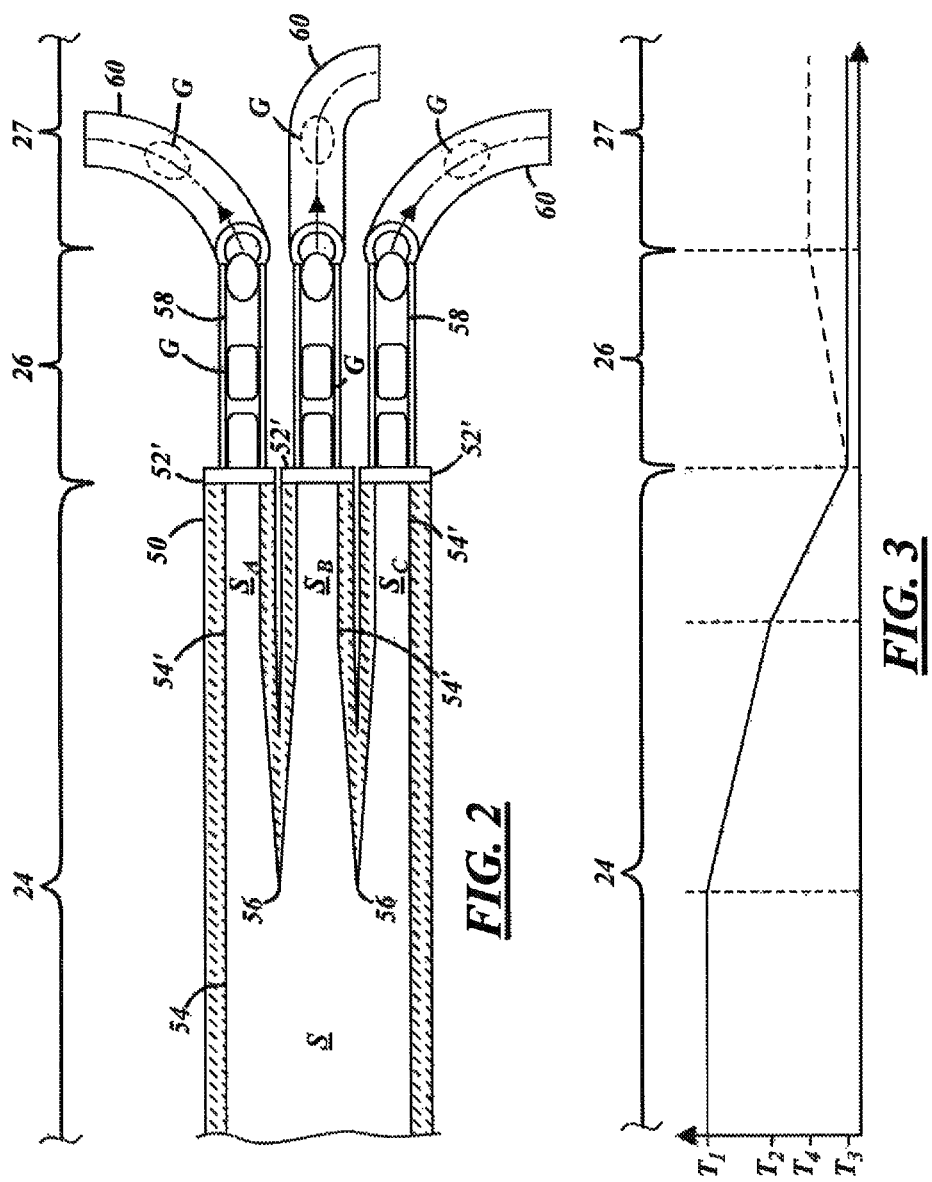

APPARATUS AND PROCESS FOR MAKING GLASS AND GLASS GOBS

The present disclosure is directed to an apparatus and a process for making glass and glass articles.

BACKGROUND AND SUMMARY OF THE DISCLOSURE

Silica-based glass, such as soda-lime-silica glass, is prevalent in the manufacture of glass containers and other articles. Molten glass used to make such articles is conventionally prepared by reacting and melting a batch of glass-forming materials in a refractory lined, continuously operated glass furnace, tank, or pot. The batch of glass-forming materials is typically introduced into the furnace by being deposited onto a pool of molten glass already in the furnace and is gradually melted into the pool by the continuous application of heat. After the batch has been melted, refined, and homogenized within the furnace, the resulting molten glass is typically directed to one or more forehearths where it is thermally conditioned by being cooled to a suitable temperature for forming. A feeder located at a downstream end of the one or more forehearths may be used to measure out predetermined amounts of molten glass known as "gobs." The gobs may then be formed into individual glass articles by a glass forming machine. U.S. patents that illustrate glass manufacturing processes of this type include U.S. Pat. Nos. 2,593,197; 2,955,384; 2,975,224; and 3,057,175.

Commercial-scale glass furnaces are typically designed to produce several hundred tons of glass per day. As such, these furnaces typically hold, on a continuous basis, relatively large volumes of molten glass having depths of between two and four feet. The thermal and structural stability of these glass furnaces is provided by lining the furnaces with relatively thick layers or bricks of refractory material. In order to prevent damage to the refractory linings of such furnaces, it is generally believed to be desirable to operate the furnaces on a continuous basis and to constantly maintain the glass within the furnace in a flowable molten state, as doing so helps avoid temperature variations and/or fluctuations in the furnaces, which helps reduce thermal stresses within the refractory linings of the furnaces. However, the continuous operation of such furnaces may result in a production rate of glass articles that is greater than the actual demand for new glass articles. In addition, even if the production of glass articles is stopped, for example, during a holiday period, a continuous supply of heat must still be applied to the glass within the furnace during the entire stoppage period in order to continuously maintain the glass in a molten state.

A general object of the present disclosure, in accordance with one aspect of the disclosure, is to provide a process for making glass and glass articles that can be operated in a more energy efficient and economical manner than conventional glass manufacturing processes.

The present disclosure embodies a number of aspects that can be implemented separately from or in combination with each other.

A process for making glass in accordance with one aspect of the disclosure includes: (a) compacting glass batch materials into a continuous sheet having a thickness of less than three centimeters; (b) flowing the sheet down a downward sloping surface; and (c) selectively and locally heating one or more portions of the sheet to melt the sheet as the sheet flows down the downward sloping surface. The one or more portions of the sheet may be selectively and locally heated in step (c) using electric heaters, induction heaters, fuel-fired heaters, microwave generators, or a combination thereof.

In accordance with another aspect of the disclosure, there is provided a process for making glass gobs on demand that includes: (a) providing a sheet of molten glass having a thickness in the range of two centimeters to seven centimeters in a staging section; (b) holding the sheet of molten glass in the staging section when there is no demand for glass articles; and (c) flowing a portion of the sheet into a gob forming section when there is a demand for production of glass articles. The sheet of molten glass may be allowed to solidify within the staging section, the gob forming section, or both during a non-production period, and may be re-melted when production resumes. A discrete gob of molten glass having a predetermined length, width, and thickness may be formed by cutting the portion of the sheet that has been flowed into the gob forming section from a remaining portion of the sheet.

In accordance with yet another aspect of the disclosure, there is provided an apparatus for making glass gobs on demand that includes: a hopper to distribute glass batch materials over a surface as a continuous layer; a compactor to compact the layer into a sheet having a thickness of less than ten centimeters; a melting and refining section having inlet and outlet openings and a downward sloping surface extending therebetween; a conveyor to carry the sheet from the compactor to the melting and refining section; a heater to selectively and locally heat the sheet within the melting and refining section as the sheet flows down the downward sloping surface; a staging section positioned to receive the sheet as the sheet flows out the outlet opening of the melting and refining section; and a gob forming section positioned to receive an end portion of the sheet from the staging section and to cut the end portion of the sheet from a remaining portion of the sheet to form a discrete gob of molten glass having a predetermined length, width, and thickness.

BRIEF DESCRIPTION OF THE DRAWINGS

The disclosure, together with additional objects, features, advantages and aspects thereof, will be best understood from the following description, the appended claims and the accompanying drawings, in which:

FIG. 2 is a top cross-sectional view of a portion of the apparatus of FIG. 1; and FIG. 3 is a schematic illustration of a desired temperature profile within a portion of the apparatus of FIG. 1.

DETAILED DESCRIPTION

Figure 1:
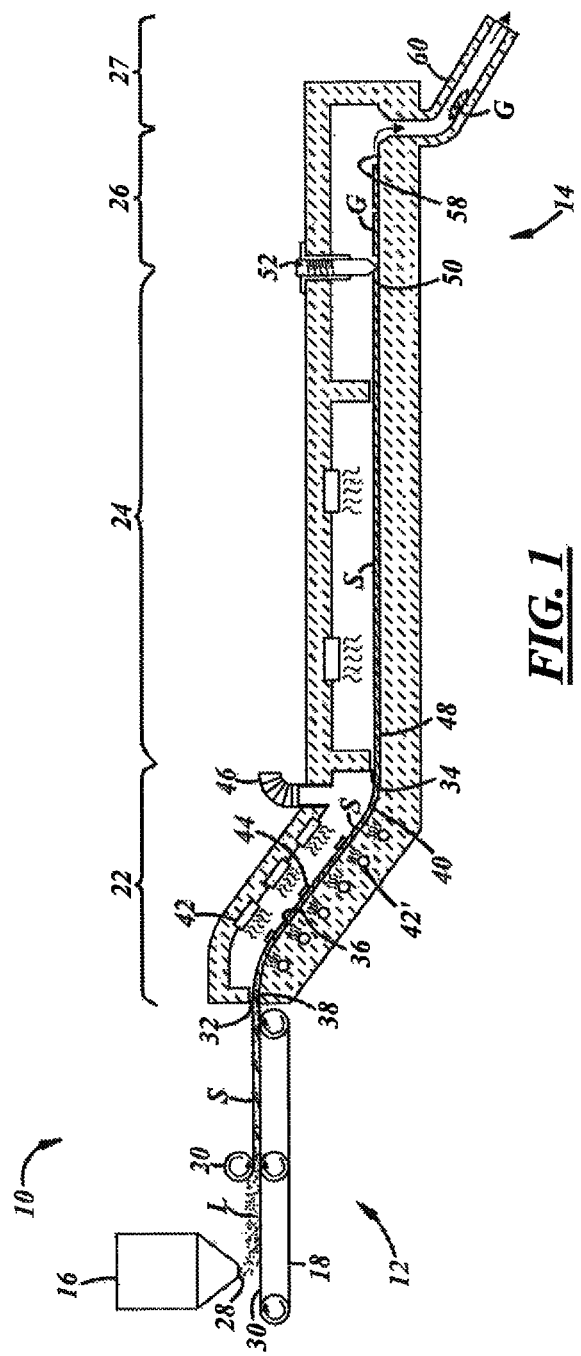
FIG. 1 is a side cross-sectional view of an apparatus for making glass and glass gobs on demand in accordance with an illustrative embodiment of the present disclosure.

FIG. 1 illustrates an apparatus 10 for making glass and glass gobs, in accordance with an illustrative embodiment of the present disclosure. The apparatus 10 can produce molten glass and molten glass gobs without the use of conventional melting tanks or pots in which relatively large volumes of molten glass are typically held and homogenized by mechanical stirrers or by naturally occurring, circulating convection currents within the molten glass. In addition, the apparatus 10 can be operated on a continuous or intermittent basis to allow for the production of glass articles when there is a demand for such articles, and to allow for production to be safely and intermittently stopped when no demand exists or when it is desirable to halt production for some other reason. For example, it may be desirable to temporarily cease production during a vacation period or holiday.

The apparatus 10 illustrated in FIG. 1 includes an upstream end 12, a downstream end 14, a hopper 16, a conveyor 18, a compactor 20, a melting and refining section 22, a staging section 24, a gob forming section 26, and a gob distribution section 27.

The hopper 16 is located at the upstream end 12 of the apparatus 10 and provides the apparatus 10 with a continuous or discontinuous supply of granular or finely divided glass batch materials for processing. The glass batch materials may include a mixture of glass-forming materials and additive materials, e.g., colorants, decolorizers, temporary reactants, binder materials, and/or microwave susceptor materials. The glass-forming materials may include a combination of raw materials and recycled glass materials, e.g. cullet. The hopper 16 includes an opening 28 in a lower portion thereof through which the mixture of glass batch materials is dispensed. The mixture of glass batch materials may be dispensed from the hopper 16 onto an upper surface 30 of the conveyor 18 in the form of a continuous layer L. Thereafter, the layer L of loose glass batch materials may be compacted into the form of a sheet S, for example, by being passed through the compactor 20. In the embodiment illustrated in FIG. 1, the compactor 20 is a roll compactor and includes a pair of opposed rollers. The additive materials may be added to the mixture of glass batch materials during or before compaction.

The sheet S of compacted glass batch materials may have a thickness of less than about ten centimeters. For example, the sheet S of compacted glass batch materials may have a thickness in the range of two centimeters to ten centimeters, including all ranges and subranges therebetween. In one specific embodiment, the layer L may be compacted into a continuous sheet S having a thickness of less than three centimeters. After compaction, the sheet S may be carried by the conveyor 18 to the melting and refining section 22 for further processing.

The melting and refining section 22 illustrated in FIG. 1 is located downstream of the compactor 20 and includes inlet and outlet openings 32, 34 and a downward sloping surface 36 having an upstream end 38 and a downstream end 40. The downward sloping surface 36 extends between the inlet and outlet openings 32, 34 and provides a flow surface upon which the sheet S of compacted glass batch materials can flow. The downward sloping surface 36 may slope downward at an angle of between 10 degrees and 30 degrees to the horizontal such that the sheet S may flow by gravity down the downward sloping surface 36. The sheet S may have a thickness as it flows down the downward sloping surface 36 within the melting and refining section 22 that is substantially the same or somewhat less than its thickness directly after compaction. For example, the sheet S may have a thickness as it flows down the downward sloping surface 36 in the range of two centimeters to seven centimeters, including all ranges and subranges therebetween. Accordingly, the sheet S may have a thickness that is relatively shallow in comparison to the level or depth of molten glass in conventional glass melting furnaces.

The sheet S of compacted glass batch materials is heated within the melting and refining section 22 as it flows down the downward sloping surface 36 to bring the glass batch materials to a molten state and to refine the molten glass. For example, the sheet S may be heated within the melting and refining section 22 as it flows down the downward sloping surface 36 to a temperature in the range of 1300 degrees Celsius to 1500 degrees Celsius, including all ranges and subranges therebetween. In some embodiments, this may include heating the sheet S to a temperature in the range of 1400 degrees Celsius to 1450 degrees Celsius, including all ranges and subranges therebetween, for a predetermined duration to encourage gas bubbles within the molten glass to rise to a free surface thereof and escape.

Accordingly, the melting and refining section 22 may include one or more heaters 42, 42' that can selectively and locally heat one or more portions of the sheet S as the sheet S flows down the downward sloping surface 36. The heaters 42, 42' may be in the form of electric heaters, induction heaters, fuel-fired heaters, microwave generators, or a combination thereof. If one or both of the heaters 42, 42' are microwave generators, the heaters 42, 42' may be configured to heat the sheet S by directing microwave energy having a frequency in the range of 915 MHz to 2450 MHz at one or more portions of the sheet S, including all ranges and subranges therebetween. In such case, the one or more portions of the sheet S may be selectively and locally heated by absorbing the directed microwave energy. The efficiency of the microwave heating process may be optimized by compacting the glass batch materials into a sheet S having a thickness of less than three centimeters and by preheating the sheet S to a temperature of at least 700 degrees Celsius before it is exposed to the microwave energy.

The flow rate of the sheet S through the melting and refining section 22 may be controlled or adjusted to align with actual production demands and/or with a desired operating schedule. During operation, the flow rate of the sheet S and the amount of heat absorbed by the sheet S may be controlled such that the sheet S is substantially completely melted and refined by the time it reaches the downstream end 40 of the downward sloping surface 36. The flow rate of the sheet S within the melting and refining section 22 may depend, for example, upon the temperature of the sheet S and the slope angle of the downward sloping surface 36. In addition, the flow rate of the sheet S within the melting and refining section 22 may be controlled during operation by adjusting the rate at which glass batch materials are supplied to the melting and refining section 22 and to the downward sloping surface 36.

The melting and refining section 22 may include one or more vibrators 44 for imparting vibration energy, e.g., sonic energy, to the sheet S as it flows down the downward sloping surface 36. The use of one or more vibrators 44 within the section 22 may encourage gas bubbles dissolved or entrapped within the sheet S to rapidly rise to a free surface thereof and escape. Vibration energy may be imparted to the sheet S, for example, by coupling the one or more vibrators 44 to the downward sloping surface 36. The one or more vibrators 44 may be coupled to the downward sloping surface 36, for example, by being mounted on or under, embedded in, or otherwise carried by the downward sloping surface 36.

A vacuum pump and evacuation system 46 may be in fluid communication with the apparatus 10 for creating a sub-atmospheric pressure environment within the melting and refining section 22 and/or the staging section 24. Lowering the atmospheric pressure within the melting and refining section 22 may help increase the rate at which gas bubbles are released from the sheet S as it flows down the downward sloping surface 36. In addition, the vacuum pump and evacuation system 46 may help maintain a suitably low pressure environment within the melting and refining section 22 by drawing off gases that are continuously released from the sheet S as it is melted and refined.

The staging section 24 is positioned to receive the sheet S of molten glass from the melting and refining section 22 and to deliver the sheet S of molten glass to the gob forming section 26 when there is a demand for the production of new glass articles. Alternatively, when production demands are low or nonexistent, or when it is desirable to halt production for some other reason, the staging section 24 may hold or stage the sheet S until such time as it is desired to produce new glass articles. The sheet S may be held in a molten state within the staging section 24 or the sheet S may be allowed to cool to a solid state while it is being held within the staging section 24. The sheet S may be cooled within the staging section 24, for example, by selectively reducing or eliminating the amount of heat that is applied to the sheet S. If the sheet S has solidified within the staging section 24 during a non-production period, production may be quickly and easily resumed by applying a sufficient amount of heat to the sheet S to return the sheet S to a flowable molten state.

Commercial-scale glass furnaces have conventionally been designed to hold relatively large volumes of molten glass and have been lined with relatively thick layers of refractory material to provide the furnaces with adequate thermal and structural stability. To avoid damaging temperature variations and/or fluctuations in the relatively thick refractory linings of such furnaces, the furnaces are generally operated on a continuous basis, with the glass in the furnaces being constantly maintained in a flowable molten state. The presently disclosed apparatus 10, however, can be operated on a continuous or intermittent basis without risking harm to the operational life or structural integrity of the apparatus 10. This is due, at least in part, to the relatively shallow depth or thickness of the sheet S of molten or solidified glass that is passed through or held within the various sections of the apparatus 10, as compared to the level or depth of molten glass that is conventionally held within commercial-scale glass furnaces. In particular, the relatively shallow depth or thickness of the sheet S eliminates the need for a thick refractory lining within the apparatus 10, which allows the apparatus 10 to be uniformly heated and/or cooled more rapidly than conventional glass furnaces. For example, the sheet S may be supported within the apparatus 10 by a relatively thin layer of refractory metal and/or ceramic.

Accordingly, the relatively shallow depth or thickness of the sheet S allows the sheet S to be rapidly cooled to a solid state within the staging section 24 without damaging the structure of the apparatus 10, which allows the apparatus 10 to be quickly and safely shutdown and allows the amount of heat applied to the sheet S to be lowered or eliminated during the entire shutdown period for additional energy savings. Also, the relatively shallow depth or thickness of the sheet S allows the sheet S to be rapidly and safely re-melted, which the apparatus 10 to be quickly and safely restarted so that production can resume. Because the apparatus 10 can be quickly and safely shutdown and restarted, the apparatus 10 can be safely, efficiently, and easily operated in a manner which coincides with a desired production schedule and/or with a desired operating schedule.

As illustrated in FIG. 1, the staging section 24 includes an upstream end 48 and a downstream end 50, and extends in a generally horizontal direction between the melting and refining section 22 and the gob forming section 26 of the apparatus 10. The width and the thickness of the sheet S of molten glass may be generally uniform along the length of the staging section 24, i.e., from the upstream end 48 to the downstream end 50 of the staging section 24. Or, the width and the thickness of the sheet S of molten glass may be changed as the sheet S flows through the staging section 24. For example, the width and the thickness of the sheet S may be altered within the staging section 24 so that the sheet S exhibits a desired width and thickness by the time it reaches the gob forming section 26.

When it is desirable to produce glass articles from the sheet S of molten glass, a predetermined amount of the sheet S may be flowed out of the downstream end 50 of the staging section 24 and into the gob forming section 26. The amount or length of the sheet S that is flowed or metered into the gob forming section 26 may be controlled, for example, using a lateral flow monitor or sensor positioned at or near the downstream end 50 of the staging section 24. Accordingly, the volume of molten glass flowed into the gob forming section 26 may be controlled by controlling the thickness and width of the sheet S within the staging section 24 and by controlling the length of the sheet S that is metered into the gob forming section 26.

The portion of the sheet S flowed into the gob forming section 26 may be cut from the remaining portion of the sheet S, for example, by a cutter 52 to form a discrete gob G of molten glass having a desired length, width, and thickness, and thus a desired volume. In some embodiments, it may be desirable to form a molten glass gob G that has a length in the range of 0.5 inches to 10 inches, a width in the range of 0.25 inches to 2.5 inches, a thickness in the range of 0.25 inches to 2.5 inches, and a volume in the range of 0.5 ounces to 60 ounces, including all ranges and subranges within these ranges.

The discrete gob G of molten glass may be cut from the sheet S such that the gob G initially exhibits a suitable shape for being formed into a glass article by a glass forming machine. In other embodiments, it may be desirable to modify the shape of the gob G before it is sent to a glass forming machine.

In the embodiment illustrated in FIG. 1, the gob G is manipulated into a somewhat different shape as it is transported along a conduit 58 located within the gob forming section 26. Thereafter, the gob G is received in a chute 60 at the entrance to the distribution section 27, which may deliver the gob G to a glass forming machine.

It may be desirable to continuously cut gobs G of molten glass from the sheet S at regular intervals so that a regular and continuous supply of glass articles can be produced. In other embodiments, the production of glass gobs G may be intermittent and may vary in accordance with actual production demands and/or with a desired production schedule. For example, gobs G of molten glass may be cut from the sheet S at regular intervals when there is an ongoing demand for new glass articles. However, when no demand exists or when production is interrupted for some other reason, the sheet S may be held within the staging section 24 in a molten or solid state until production resumes. In other embodiments, it may be desirable to rapidly expel at least a portion of the molten glass from the apparatus 10 just prior to shutdown, for example, to reduce the amount of glass that remains in the apparatus 10 during the shutdown period. In such case, the temperature of the sheet S may be rapidly increased just prior to shutdown so that the sheet S exhibits a suitably low viscosity to allow at least a portion of the sheet S to rapidly flow out of the staging section 24 and out of the apparatus 10. Also, and/or at the same time the sheet S is heated, the rate at which molten glass flows through the various sections 24, 26, 27 and is expelled from the apparatus 10 may be increased by tilting the sections 24, 26, 27 in a downward direction relative to the horizontal. The extra heat applied to the sheet S and/or the downward slope of the sections 24, 26, 27 may help minimize the thickness of the sheet S that solidifies in one or more of the sections 24, 26, 27 after the apparatus 10 has been shutdown.

Referring now to FIG. 2, the staging section 24 may include one main channel 54 that splits or branches off into multiple channels 54'. In such case, splitters 56 may be positioned at the branching points to split or divide the sheet S into multiple continuous sheets $S_A$, $S_B$, $S_C$. This arrangement may allow for multiple gobs G to be cut substantially simultaneously from the multiple sheets $S_A$, $S_B$, $S_C$ at the downstream end 50 of the staging section 24. In some embodiments, the apparatus 10 may include multiple cutters 52' so that multiple gobs G may be cut from the multiple sheets $S_A$, $S_B$, $S_C$ at the same or different times.

As illustrated in FIG. 2, the width of the sheet S (or sheets $S_A$, $S_B$, $S_C$) of molten glass may be gradually decreased (or increased) within the staging section 24, for example, by gradually narrowing (or widening) the width of the channel 54 or channels 54' within the staging section 24. Decreasing (or increasing) the width of the sheet S (or sheets $S_A$, $S_B$, $S_C$) as the sheet S (or sheets $S_A$, $S_B$, $S_C$) flow through the staging section 24 may result in a corresponding increase (or decrease) in the thickness of the sheet S (or sheets $S_A$, $S_B$, $S_C$) from the upstream end 48 to the downstream end 50 of the staging section 24.

The temperature of the molten glass may be controlled or adjusted within the staging section 24 and/or the gob forming section 26 so that the molten glass exhibits certain desirable physical and/or chemical characteristics at specific locations within the sections 24, 26. The temperature of the molten glass within these sections 24, 26 may be controlled or adjusted, for example, by electric heaters, induction heaters, fuel-fired heaters, microwave generators, or a combination thereof.

As illustrated in FIGS. 2 and 3, during production, the sheet S may enter the staging section 24 at a first temperature T1 of about 1550 degrees Celsius, and may be gradually cooled to a second temperature T2 of about 1450 degrees Celsius as the sheet S flows past the splitters 56 and into the channels 54'. Thereafter, the sheets $S_A$, $S_B$, $S_C$ may be brought down to a third temperature T3 of about 1150 degrees Celsius at the downstream end 50 of the staging section 24 so that the sheets $S_A$, $S_B$, $S_C$ exhibit a suitable temperature for gob forming by the time the sheets $S_A$, $S_B$, $S_C$ enter the gob forming section 26. For example, the sheet S may enter the staging section 24 at a first temperature T1 in the range of 1500 degrees Celsius to 1600 degrees Celsius, and may be brought down to a second temperature T2 in the range of 1400 degrees Celsius to 1500 degrees Celsius, and then to a third temperature T3 in the range of 1000 degrees Celsius to 1250 degrees Celsius, including all ranges and subranges between these ranges.

The gob G may exhibit a suitable temperature for being formed into a glass article immediately after it is cut from the sheet S in the gob forming section 26. In such case, the temperature of the gob G may remain relatively constant (solid line) as it is passed through the gob forming section 26 and into the distribution section 27. In other embodiments, the temperature of the gob G may need to be increased to a fourth temperature T4 (dashed line) within the gob forming section 26 so that the gob G exhibits a suitable temperature for forming by the time it reaches the distribution section 27. For example, the temperature of the gob G may need to be increased to a fourth temperature T4 in the range of 1100 degrees Celsius to 1350 degrees Celsius, including all ranges and subranges therebetween, before it is delivered to the distribution section 27.

In some embodiments, it may be desirable to thermally condition and/or thermally homogenize the gobs G while the gobs G are en route to the forming machines. This may include heating the gobs G of molten glass by induction, or by directing thermal energy, e.g., radiant energy or microwave energy, at the chutes 60 or at the gobs G themselves.

There thus has been disclosed an apparatus and a process for making glass and glass gobs, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for making glass that includes:
   (a) providing a sheet of glass batch materials;
   (b) flowing said sheet of glass batch materials through a melting section having a downward sloping surface;
   (c) heating one or more portions of said sheet of glass batch materials to melt the glass batch materials on said downward sloping surface to produce a sheet of molten glass;
   (d) flowing said sheet of molten glass from said melting section into a staging section having a length that extends from said melting section to a forming section; and
   (e) allowing said sheet of molten glass to cool and solidify along the entire length of said staging section to produce a solid glass sheet that extends from said melting section to said forming section.

2. The process set forth in claim 1 that also includes:
   prior to said step (a), compacting glass batch materials to produce said sheet of glass batch materials, wherein said sheet of glass batch materials has a thickness of less than ten centimeters.

3. The process set forth in claim 1 wherein said steps (b) and (c) are carried out under reduced pressure to promote release of gas bubbles from the molten glass.

4. The process set forth in claim 1 that includes:
   vibrating said sheet of molten glass on said downward sloping surface to promote release of gas bubbles from the molten glass.

5. The process set forth in claim 1 wherein said one or more portions of said sheet of glass batch materials are selectively and locally heated in said step (c) by microwave energy, electric heaters, induction heaters, fuel-fired heaters, microwave generators, or a combination thereof.

6. The process set forth in claim 1 wherein said sheet of glass batch materials has a thickness of less than three centimeters, and said one or more portions of said sheet of glass batch materials are selectively and locally heated by microwave energy having a frequency in the range of 915 MHz to 2450 MHz.

7. The process set forth in claim 1 that includes:
   after said step (e), heating said solid glass sheet to return the solid glass to a flowable molten state.

8. The process set forth in claim 1 that includes:
   flowing said sheet of molten glass from said staging section into said forming section and forming glass products from said sheet of molten glass.

9. The process set forth in claim 8 wherein said sheet of molten glass has a thickness in the range of two centimeters to seven centimeters, and said thickness of said sheet of molten glass is generally uniform as said sheet of molten glass flows through said melting section and said staging section.

10. The process set forth in claim 1 that does not include: holding or stirring a volume of molten glass in a melting tank or pot.

11. The process set forth in claim 1 wherein the sheet of molten glass is allowed to cool and solidify within the staging section on a surface of a refractory metal or ceramic material.

12. The process set forth in claim 1 wherein said sheet of molten glass is allowed to cool and solidify within said melting section, said staging section, and said forming section to produce a solid glass sheet that extends from said melting section into said forming section.

13. A process for making glass that includes:
   (a) providing a sheet of molten glass having a thickness in the range of two centimeters to seven centimeters in a staging section, wherein said staging section has a length that extends from a melting section to a forming section;
   (b) allowing said sheet of molten glass to cool and solidify along the entire length of said staging section when there is no demand for glass production to produce a solid glass sheet that extends from said melting section to said forming section; and
   (c) flowing a portion of said sheet of molten glass from said staging section into said forming section when there is a demand for glass production.

14. The process set forth in claim 13 that includes:
after said step (c), forming glass products from said sheet of molten glass.

15. The process set forth in claim 14 that includes:
after said step (b), heating said solid glass sheet to return said sheet to a flowable molten state when demand for glass production resumes.

16. The process set forth in claim 13 that includes:
before said step (c), cooling said portion of said sheet of molten glass to a desired temperature for cutting.

17. The process set forth in claim 13 that includes:
before said step (c), flowing said portion of said sheet of molten glass into a narrowing channel to increase the thickness of said portion of said sheet of molten glass.

18. The process set forth in claim 13 that includes:
after said step (c), cutting said portion of said sheet of molten glass from a remaining portion of said sheet of molten glass to form a discrete gob of molten glass having a predetermined length, width, and thickness.

19. The process set forth in claim 18 that includes:
manipulating said discrete gob of molten glass into a suitable shape for being formed in a glass forming machine.

20. The process set forth in claim 18 that includes:
forming said discrete gob of molten glass into a glass article.

21. The process set forth in claim 13 that includes:
after said step (c), splitting said sheet of molten glass into multiple continuous sheets of molten glass.

22. The process set forth in claim 21 that includes:
simultaneously cutting multiple discrete gobs of molten glass from said multiple continuous sheets of molten glass.

23. The process set forth in claim 13 wherein said sheet of molten glass is supported within said staging section and within said forming section on a surface of a refractory metal or ceramic material.

24. A process for making glass including:
   (a) providing glass batch materials to a melting section;
   (b) heating the glass batch materials in the melting section to produce a sheet of molten glass having a thickness in the range of two centimeters to seven centimeters;
   (c) directing said sheet of molten glass to flow from the melting section into a staging section that extends between the melting section and a forming section;
   (d) allowing the sheet of molten glass to cool and solidify within the staging section to produce a solid glass sheet, the sheet of molten glass cooling and solidifying in the staging section on a surface of a refractory metal or ceramic material; and then
   (e) heating the solid glass sheet to return the solid glass to a flowable molten state.

25. The process set forth in claim 24 wherein the glass batch materials are heated in the melting section on a surface of a refractory metal or ceramic material.

26. The process set forth in claim 24 including:
directing the sheet of molten glass into a forming section, and forming glass products from said sheet of molten glass.

* * * * *